United States Patent
Sun et al.

(10) Patent No.: US 8,483,526 B2
(45) Date of Patent: Jul. 9, 2013

(54) MICRO-SIZE OPTICAL SWITCH ON SILICON-ON-INSULATOR PLATFORM

(75) Inventors: DeGui Sun, Ottawa (CA); Trevor Hall, Ottawa (CA)

(73) Assignee: University of Ottawa, Ottawa, Ontario (CA)

( * ) Notice: Subject to any disclaimer, the term of this patent is extended or adjusted under 35 U.S.C. 154(b) by 296 days.

(21) Appl. No.: 12/968,717

(22) Filed: Dec. 15, 2010

(65) Prior Publication Data
US 2011/0142394 A1    Jun. 16, 2011

Related U.S. Application Data

(60) Provisional application No. 61/286,510, filed on Dec. 15, 2009.

(51) Int. Cl.
*G02B 6/26*   (2006.01)
*G02B 6/42*   (2006.01)

(52) U.S. Cl.
USPC .............. 385/22; 385/14; 385/15; 385/18; 385/19; 385/25; 385/31; 385/39; 385/40; 385/41; 385/44; 385/45; 385/47; 385/50

(58) Field of Classification Search
USPC .................... 385/18, 19, 22, 41, 47
See application file for complete search history.

(56) References Cited

U.S. PATENT DOCUMENTS

| | | | |
|---|---|---|---|
| 6,915,032 B1 * | 7/2005 | White et al. | 385/17 |
| 7,212,712 B2 * | 5/2007 | Ramadan | 385/50 |
| 7,792,399 B2 * | 9/2010 | Kato | 385/18 |
| 2002/0141029 A1 * | 10/2002 | Carlson et al. | 359/244 |
| 2006/0062329 A1 * | 3/2006 | Chua | 375/316 |

* cited by examiner

*Primary Examiner* — Ryan Lepisto
(74) *Attorney, Agent, or Firm* — Harness, Dickey & Pierce PLC

(57) ABSTRACT

An innovative micro-size photonic switch is presented. The photonic switch is comprised of: a mirror having a reflecting surface; an input waveguide; and an output tapered waveguide structure. The photonic switch further includes a switching mechanism disposed adjacent to the reflecting surface and operable to change the refractive index along the reflective surface and thereby shift the angle at which the optical signal reflects from the mirror. More specifically, the switching mechanism may operate to change concentration of free carrier distribution along the reflective surface and thereby displace the effective reflecting interface of the mirror. In this way, the optical signal can be directed to one of two or more output ports of the output tapered waveguide structure and finally exited by one output waveguide channel that is connected to the selected port of the output tapered waveguide structure.

18 Claims, 6 Drawing Sheets

MICRO-SIZE OPTICAL SWITCH ON SILICON-ON-INSULATOR PLATFORM

CROSS-REFERENCE TO RELATED APPLICATIONS

This application claims the benefit of U.S. Provisional Application No. 61/286,510, filed on Dec. 15, 2009. The entire disclosure of the above application is incorporated herein by reference.

FIELD

The present disclosure relates to optical/photonic switches for use in optical systems and, more specifically, to micro-size optical switches that employ a corner-turning mirror on a silicon-on-insulator platform.

BACKGROUND

Highly integrated high-speed optical switches and matrix switches are in high demand by the modern optical communications and information processing systems, industrial automatic control systems, test & measurement instrumentation and optical signal sensing systems. As the information and data capacities in applications are rapidly increasing, the scalability, density and integrity of optical switches and matrix switches are prominent trends. Planar lightwave circuit (PLC) technology is widely accepted for manufacturing integrated photonic components and silicon-on-insulator (SOI) waveguides and has attracted growing interest for implementing the highly integrated high-speed PLC-based optical and photonic switching devices. SOI-based PLC (SOI-PLC) technology has shown merit in photonic circuits capable of tightly integrating passive and (hybrid) active devices. However, so far only a few reports have been published on the subject of low port-count optical matrix switches on SOI-PLC platforms that exploit slow thermo-optic switch elements that have electrical power-hungry heating elements.

The overall suitability of SOI-PLC technology in manufacturing both active and passive highly integrated photonic devices and systems, and the compatibility of the SOI-PLC technology with complementary metal oxide semiconductor (CMOS) technologies makes it possible to manufacture SOI-based photonic integrated device products with commercially acceptable costs, and further form the hybrid integration of micro photonics and microelectronics on a single chip.

Deployment of free-electrons and holes injection/depletion to implement electro-optic (EO) modulation of the nanosecond level was pioneered with the silicon and SOI-PLC optical modulators as described in G. V. Treyz et al., "Silicon Mach-Zehnder waveguide interferometers based on the plasma dispersion effect," Appl. Phys. Letter Vol. 59, pp. 771-773 (1991) and A. Liu et al. "A high-speed silicon optical modulator based on a metal-oxide-semiconductor capacitor," Nature, Vol. 427, pp. 615-618 (2004). All aforementioned EO modulated devices, irrespective of switches and modulators, based on free-carrier injection/depletion plasma-dispersion-effect, are combined with Mach-Zehnder interferometer (MZI) waveguide configurations, so several intrinsic drawbacks or difficulties one may face are mainly a few centimeters of interaction length (L) between the electric field and optical signal, and a 3-5V drive voltage $V_\pi$ for a phase shift of $\pi$ between two arms of the MZI configuration due to the intrinsically required $V_\pi L$ of this MZI modulation regime. Such high drive voltage and device length are not only a negative consequence of a high-speed operating device, but the long transport path and high electric current also directly or indirectly cause high optical loss though some effective optimal approaches have been deployed to improve the modulation efficiency with a relatively small $V_\pi L$ value. In addition, the large footprint size and drive voltage of MZI based switching cells seriously restrict the R&D actions and applications of silicon photonics technology. However, the SOI waveguide, as a fundamental element of all the passive and active functional devices and systems based on a SOI-PLC platform, has achieved an acceptable level in several critical performance aspects including the optical transport loss, the carrier injection/depletion based EO modulation, and the compatibility with the conventional electronic manufacturing technology.

Therefore, it is desirable to develop a micro-size optical switch on a SOI-PLC platform that will have switching speed at nanosecond level, low optical access loss, and low polarization dependent loss. This section provides background information related to the present disclosure which is not necessarily prior art.

SUMMARY

A micro-size photonic switch is presented. The photonic switch is comprised of: a mirror having a reflecting surface; an input waveguide configured to receive an optical signal and output the optical signal at an angle of incidence upon the reflecting surface; an output tapered waveguide structure configured to output the optical signal reflected by the reflecting surface; and a set of output waveguide channels configured to receive the switched signal from the tapered waveguide structure and output the switched signal, where an angle formed between the input waveguide and the output tapered waveguide structure at the reflecting surface exceeds the angle at which total internal reflection occurs. With a specifically designed electric field created by an electrodes system, a switching mechanism is disposed adjacent to the reflecting surface and operable to change the refractive index along the reflective surface and thereby shifts both the angle and position at which the optical signal reflects from the mirror. In this way, the optical signal can be directed to one of two or more output ports of the output tapered waveguide structure and further exited at the expected one of the output waveguide channels.

In one embodiment, the mirror, the input waveguide, the output tapered waveguide structure and the output waveguide channels are formed in a silicon layer of a silicon-on-insulator structure. The switching mechanism operates to change concentration of free carrier distribution along the reflective surface and thereby displaces the effective reflecting interface of the mirror.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
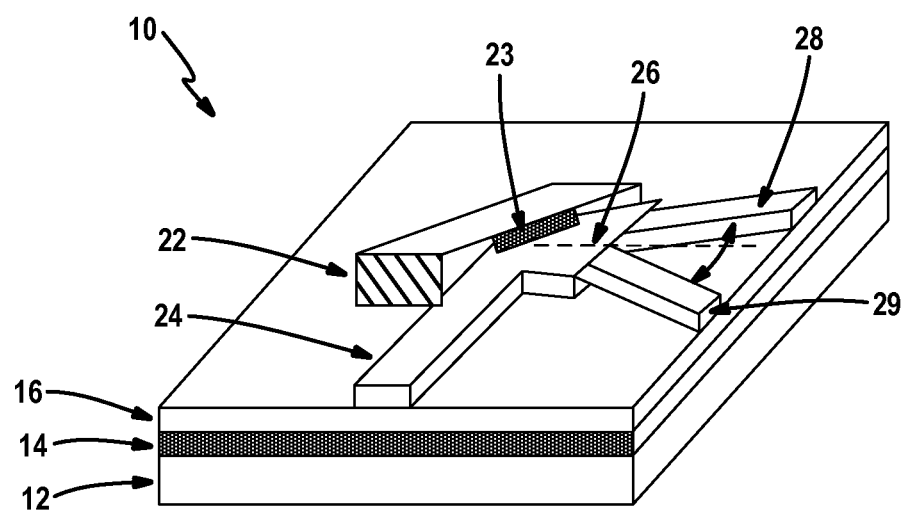
FIG. 1 is a perspective view of a photonic switch using a corner-turning mirror.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 schematically depicts a photonic switch 10 using a corner-turning mirror. In the exemplary embodiment, the photonic switch is constructed on a silicon-on-insulator (SOI) platform. More specifically, the platform includes a silicon substrate 12, a silicon dioxide ($SiO_2$) layer 14 disposed on the substrate 12 (which is referred to as a buried layer of an insulator), and another silicon layer 16 disposed on top of the insulator layer 14. The top silicon layer 16 is used to manufacture waveguides and otherwise support components of the switch. This 3-layer structure is commonly called an SOI platform for creating small channel high index difference waveguides, resulting in high confinement to optical beams and small waveguide channel size. Other materials and platform arrangements are contemplated by this disclosure.

The photonic switch 10 is formed on the top silicon layer 16. In an exemplary embodiment, the switch is comprised of: a mirror 22 having a reflecting surface 23; an input waveguide 24, an output tapered waveguide structure 26, two output waveguide channels 28 and 29, and a switching mechanism 30. The input waveguide 24 provides an input configured to receive an optical signal and an output interfaced with the reflecting surface. Likewise, the output tapered waveguide structure 26 provides an input interfaced with the reflecting surface to receive the optical signal reflected by the mirror 22. Further, the two output waveguide channels 28 and 29 provides two input ends to receive the switched optical signal from the tapered waveguide structure 26 and two output ends for outputting this optical signal at the selected channel. The switch 10 can operate in different switch modes, where the angle at which the optical signal reflects from the mirror differs in each switch mode as further described below. The input of the output tapered waveguide structure 26 is configured to intersect each of the switching modes of the switch and provides an output for each switching mode. The output tapered waveguide structure 26 further tapers from the input end of output waveguide channels towards the reflecting surface 23 of the mirror 22. In the exemplary embodiment, the output tapered waveguide 26 is implemented as a multi-mode interferometer optically coupled to two output waveguide channels 28, 29 although other types of output waveguides may be employed in the switch design.

Figure 2A:
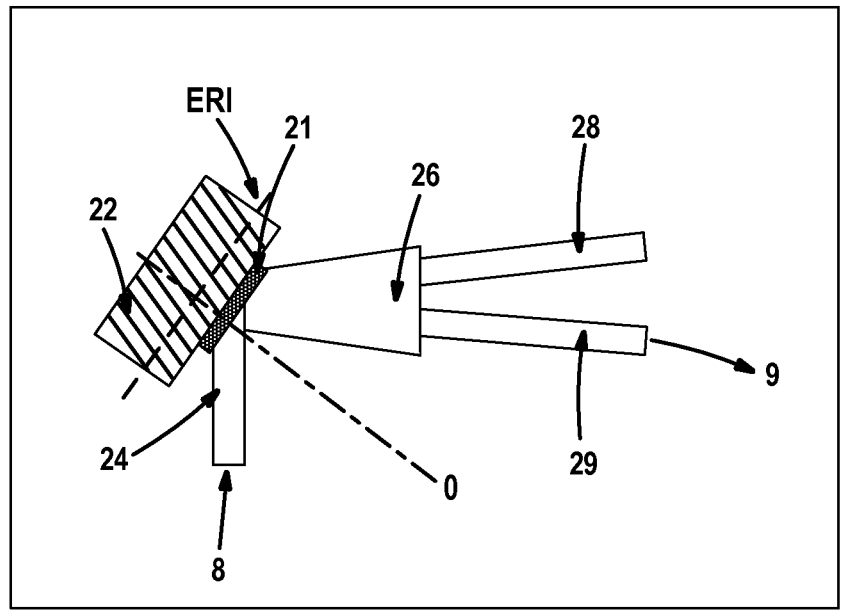
FIGS. 2A and 2B are top views of the photonic switch illustrating the switching principle without and with electro-optic modulation, respectively.

With reference to FIG. 2A, which stands for the OFF-state of this switch, the angle formed between the input waveguide 24 and the output tapered waveguide structure 26 at the reflecting surface is set as $2\theta-\Delta\theta$ that exceeds the critical angle at which total internal reflection (TIR) occurs. Namely, the normal line of the mirror surface should equally segment the angle $2\theta-\Delta\theta$ between the input waveguide and one output channel (in this case, output channel 28). If the refractive indices of the mirror and waveguide materials are defined as $n_m$ and $n_1$, respectively, the equation $\sin(\theta) > n_m/n_1$ must be met in the total internal reflection condition. Conversely, with reference to FIG. 2B, which stands for the ON-state of this switch, the angle formed between the input waveguide 24 and the output tapered waveguide structure 26 at the reflecting surface becomes $2\theta-\Delta\theta$ due to the modulation induced angle incremental $\Delta\theta$ of the real reflecting surface, which certainly exceeds the critical angle at which the TIR occurs.

Figure 3A:
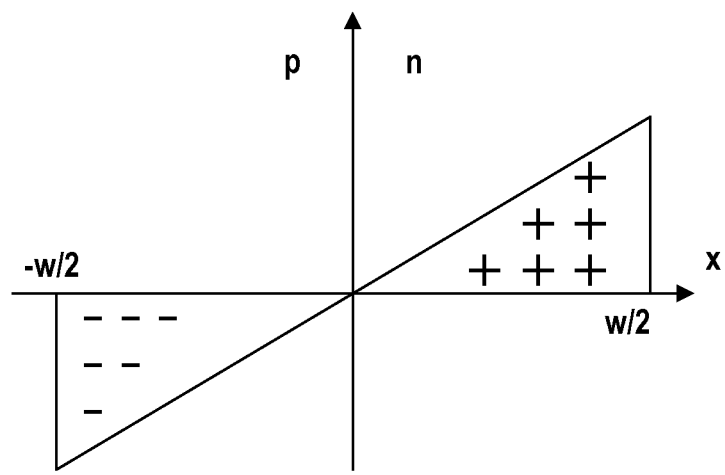
FIGS. 3A-3C are diagrams illustrating the linearly graded form of p-n junction; the linearly distributed concentration change of free-carriers; and the distribution form of refractive index change, respectively.
Figure 3B:
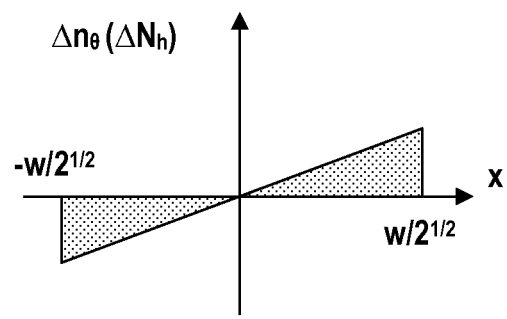

To shift the angle at which the incoming optical signal reflects from the mirror 22, a switching mechanism 30 is provided to change concentration of free carrier distribution along the reflective surface 23. In the carrier injection/depletion process of electric field, a high doping is applied to a modulation zone 21 formed adjacent to reflecting surface of the mirror. The result is a linearly distributed free-carrier concentration area as shown in FIG. 3A, where $N_D$ and $N_A$ are the free-carrier concentrations from donors and acceptors, respectively. The effective concentration change of free carriers is depicted in FIG. 3B. Research on silicon characteristics shows free carrier (electron and hole) injection or depletion can induce the changes of both refractive index and absorption of silicon material. This phenomenon is defined by the Drude-Lorenz equation and can be simplified at two typical optical communication wavelengths, 1550 nm and 1310 nm, as:

At $\lambda_0 = 1550$ nm:

$$\Delta n = \Delta n_e + \Delta n_h = -[8.8 \times 10^{-22} \Delta N_e + 8.5 \times 10^{-18} (\Delta N_h)^{0.8}] \quad (1a)$$

$$\Delta \alpha = \Delta \alpha_e + \Delta \alpha_h = 8.5 \times 10^{-18} \Delta N_e + 6.0 \times 10^{-18} \Delta N_h \quad (1b)$$

At $\lambda_0 = 1310$ nm:

$$\Delta n = \Delta n_e + \Delta n_h = -[6.2 \times 10^{-22} \Delta N_e + 6.0 \times 10^{-18} (\Delta N_h)^{0.8}] \quad (2a)$$

$$\Delta \alpha = \Delta \alpha_e + \Delta \alpha_h = 6.0 \times 10^{-18} \Delta N_e + 4.0 \times 10^{-18} \Delta N_h \quad (2b)$$

where $\Delta N_e$ and $\Delta N_h$ are the changes in the concentration of free electrons and holes, respectively; $\Delta n_e$ is the change in refractive index resulting from the change in free electron carrier concentrations; $\Delta n_h$ is the change in refractive index resulting from the change in free hole carrier concentrations; $\Delta \alpha_e$ is the change in absorption resulting from the change in free electron carrier concentrations; and $\Delta \alpha_h$ is the change in absorption resulting from the change in free hole carrier concentrations.

Figure 3C:
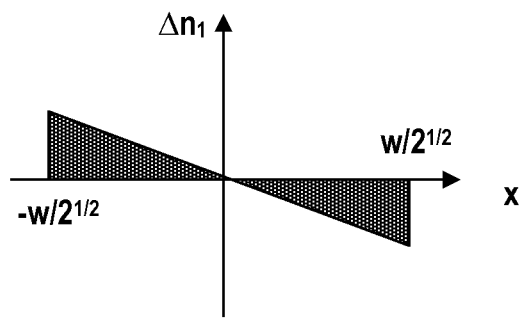

For illustration purposes, the C-band wavelength $\lambda_0 = 1550$ nm is taken as an instance to discuss the refractive index change in the highly doped/modulated zone 21. With the relation between the free-carrier density change depicted in FIG. 3B and the refractive index change defined by equation (1a), the linearly graded distribution form of the refractive index is obtained in the zone 21 of the Si waveguide channel as depicted in FIG. 3C. It is readily understood that this concept is extendable to other wavelengths Goos and Hanchen's research showed that when a light wave strikes on the interface of two materials, even if the refractive index values of these two materials and incident angle of optical beam meet the TIR condition, the effective reflecting interface (ERI) is displaced from the geometric interface, so the reflected beam has a shift along the geometric interface. This phenomenon of reflecting surface shift (or reflected beam shift) is referred to as the Goos-Hanchen (GH)

effect and the distance is called GH shift, which is indicated by $d_j$, where j=1 and j=2 stand for the polarization states perpendicular to and parallel to the incident plane of optical beam, respectively. In some books and articles, the shift distance of reflected beam along the reflecting surface is called GH shift. In this micro-optic switch, if the corner-turning angle 2θ between the input channel and output channel is set, referring A. K. Ghatak and K. Thyagarajan, "Evanescent waves and the Goos-Hanchen effect," Contemporary Optics, Plenum Press, New York (1978), we can have the expressions for the GH shift of this corner mirror is approximately as $$d_1 = \frac{\tan^2\theta}{k_0[n_1^2\sin^2\theta - n_m^2]^{1/2}} \quad (3a)$$

$$d_2 = \frac{(n_1^2/n_m^2 - 1)d_1}{\cos^2\theta + (n_1^2/n_m^2)[(n_1^2/n_m^2)\sin^2\theta - 1)]} \quad (3b)$$

where, $k_0=(2\pi/\lambda_0)$ at the wavelength $\lambda_0$ of lightwave in vacuum, and $n_m$ and $n_1$ are the refractive index values of mirror and waveguide, respectively. The model defined by equation (3) can be deployed to implement the linearly graded EO modulation to control a mini-angle rotation of the effective reflecting surface. Moreover, deployment of this modulation scheme to control rotation of the ERI can be used in switches having different arrangements.

Figure 2B:
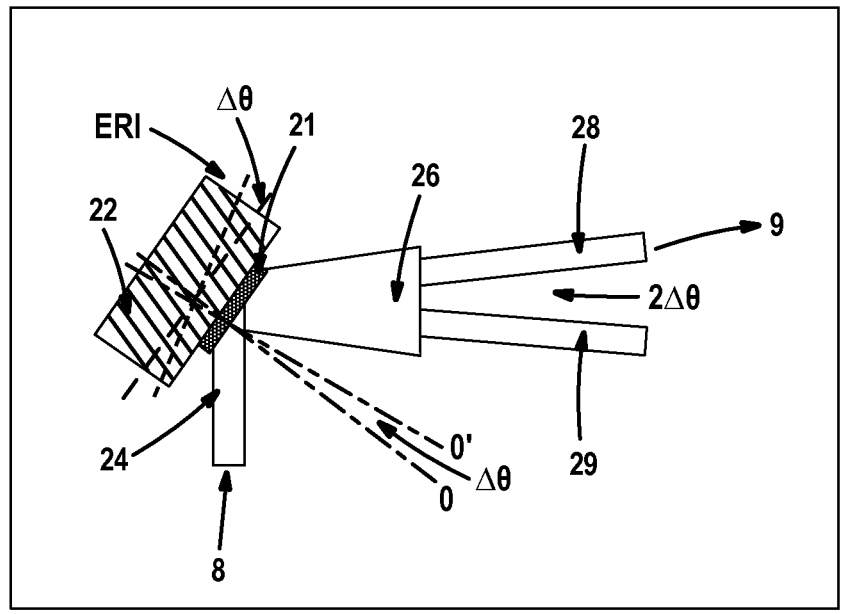

FIGS. 2A and 2B schematically depicts the switching principle and operating process of the 1×2 photonic switch 10. In this illustration, the mirror is selected to have a relatively higher refractive index material ($n_m$=1.8-2.4) to have a relatively bigger GH shift. For instance, at the 1310 nm and 1550 nm wavelengths, $Si_3N_4$ and SiON have refractive index values of 2.0 and >2.0, respectively, polymer benzocyclobutene (BCB) has refractive index value of 1.67, and some other polymers can also have relatively bigger refractive index values, so they are all selectable mirror materials. $SiO_2$ has high temperature stability and electrical insulation property, so it can also be considered as both protecting and mirror material even though its refractive index is only 1.45. Other types of mirror materials would fall within the scope of this disclosure.

Referring to FIG. 2A, when no EO modulation is applied to the system, the GH shift is uniform along the geometric interface of the mirror and SOI waveguide materials, so that the ERI (represented by the dashed line) is parallel to the geometric reflecting surface and the normal line of the ERI is the same as that of the geometric interface. In the un-modulated state, the axes of input channel 24 and output channel 29 are respectively designed at the incident and reflective directions, respectively, with respect to the original normal line 0 and with the incident/reflective angle of θ−Δθ/2 (here θ is approximately 45°). Thus, when an optical signal 8 is launched into the input channel, at the original ERI of the mirror it is reflected to the direction at the angle of θ−Δθ/2. At this reflective angle, it is directed by the output waveguide into the output channel 29 and finally exits as an output signal 9.

On the other hand, when a carrier-injection/depletion based linearly graded EO modulation is applied to the system, a corresponding linearly graded distribution of refractive index change is formed as shown in FIG. 3C. As a result, in accordance with equation (1a), a linearly distributed GH shift $d_j$ is formed along the geometric interface of the mirror and SOI waveguide materials, so the ERI (i.e., the dashed line) is rotated in a counter clockwise direction by a small angle of Δθ from the original direction to form a new ERI' (represented by the dotted line) as depicted in FIG. 2B. The normal line 0 of the ERI is also rotated by a small angle of Δθ from the original direction to form a new normal line 0'. In the modulated state, the axes of input channel 24 and output channel 28 are respectively designed at the incident and reflective directions, with respect to the rotated normal line 0' and with the incident/reflective angle of θ+Δθ/2 (here θ is approximately 45°). Thus, when an optical signal 8 is launched into the input channel 24, at the new ERI' it is reflected to the direction at the angle of θ+Δθ/2. At this reflective angle, it is directed by the tapered waveguide structure 26 to enter into the output waveguide channel 28, and finally exits as an output signal 9. In the aforementioned switching operation process, the rotated angle is set, for example, as Δθ=0.5-2°. Therefore, at the un-modulated and modulated two states, an input optical signal can have two alternative selections as outputs with this corner-turning mirror based waveguide architecture and a linearly graded EO modulation, so a 1×2 switching operation can be implemented with this switching arrangement.

As an optical switching cell, this arrangement of 1×2 optical switches has compact size, simple design and a high switching speed of nanosecond level, which lends itself to excellent scalability and applications. In addition, this regime can make the switch have a very low access loss because the highly doped area for free-carrier injection/depletion is only restricted within a micro-size zone according to equations (1b) and (2b). It is also noted that modern fabrication methods for SOI-PLC have achieved transmission loss of 0.1 dB/cm order, and the required electric drive technology for this switching system is compatible with the conventional mature microelectronic and CMOS technologies.

Figure 4A:
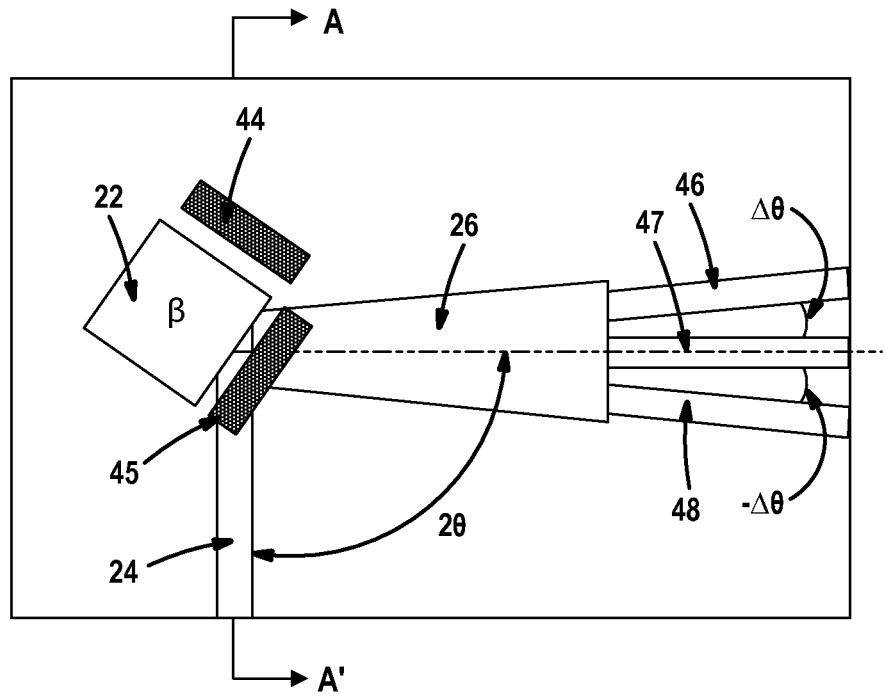
FIGS. 4A and 4B are a top view and a cross-sectional view, respectively, of an exemplary embodiment of a 1×3 photonic switch deployed as a 1×2 scheme with two electrodes.
Figure 4B:
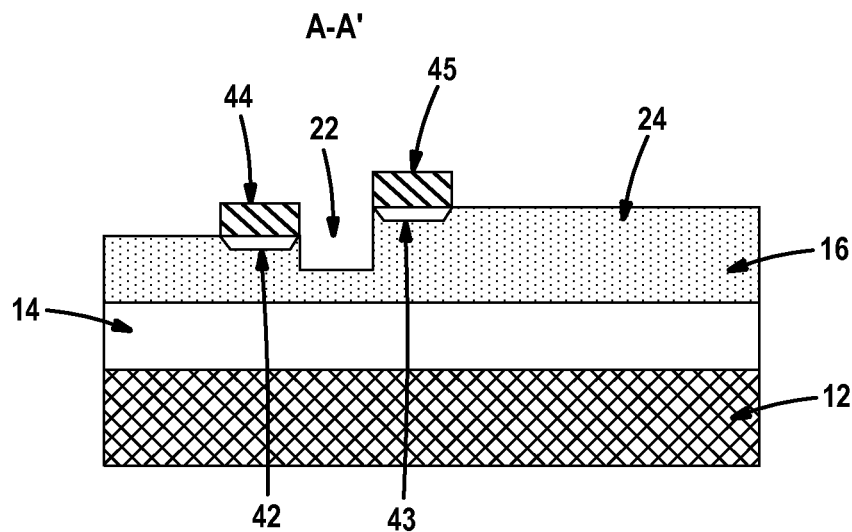

FIGS. 4A and 4B depict an exemplary embodiment of a 1×3 photonic switch 40. The switch 40 is comprised of: a mirror 22; an input waveguide 24, and an output tapered waveguide structure 26 having three output ports 46, 47, 48. In this embodiment, the switching mechanism 30 includes an n-type and p-type heavy doping areas 42, 43 as best shown in FIG. 4B. A cathode electrode 44 and an anode electrode 45 are applied on top of the doping areas 42, 43, respectively. In other embodiments, the switching mechanism 30 may be implemented with a single doped area (n-type or p-type) and an electrode electrically coupled thereto. Other arrangements for the switching mechanism are contemplated by this disclosure.

During operation, if no electrical voltage is applied between the cathode 44 and anode 45 electrodes (i.e., the OFF-state), an optical signal launched from the waveguide input port 24 is reflected by the mirror 22 to the output tapered waveguide structure 26 at first and then enters to the output waveguide channel of the middle output port 47. On the contrary, when an electrical drive voltage of +Vs (i.e., the ON-state) is applied, an inhomogeneous electric field distribution will be formed between the two electrodes 44, 45 where the mirror is inside; namely, the electric field will change from the weak state to the strong state from left to right. Since there are the n-type and p-type heavy doping areas 42, 43, underneath the cathode and anode electrodes 44, 45, respectively, the free carriers will have an inhomogeneous concentration distribution along the interface between the input waveguide 24 and the mirror 22. Due to the evanescent effect of the TIR (i.e., the GH effect), the real reflection plane (i.e., the ERI) of optical beam is within the mirror volume, the concentration variation of free carriers along the TIR interface will cause an inhomogeneous shift of the real reflection plane with respect to the TIR interface; namely the shift linearly increases from the lower to the upper direction, then the reflection beam will not only have a shift to the upper direction, but it will also have an angle incremental to the upper direction and thus will be output at the upper waveguide output port 46. Thus, a 1×2 switching process is implemented with the OFF-state and the ON-state of the electrical drive system for the photonic switch, where the lower waveguide output port 48 is not used. The aforementioned operating process with the free-carrier dispersion effect is an injection process of free-carriers.

In the aforementioned 1×2 photonic switch with a pair of electrodes—cathode and anode, no matter it is based on the 1×2 or 1×3 configuration, the following parameters can determine the switching performance: the relative distance and the intersection angle ($\beta$) of two electrodes; the concentration of the n-type and p-type heavy doping underneath anode and cathode; the concentration of the background doping in silicon waveguide layer; the performance and efficiency of the optical waveguide/CTM system; and the voltage of applied to the electrodes.

Figure 5A:
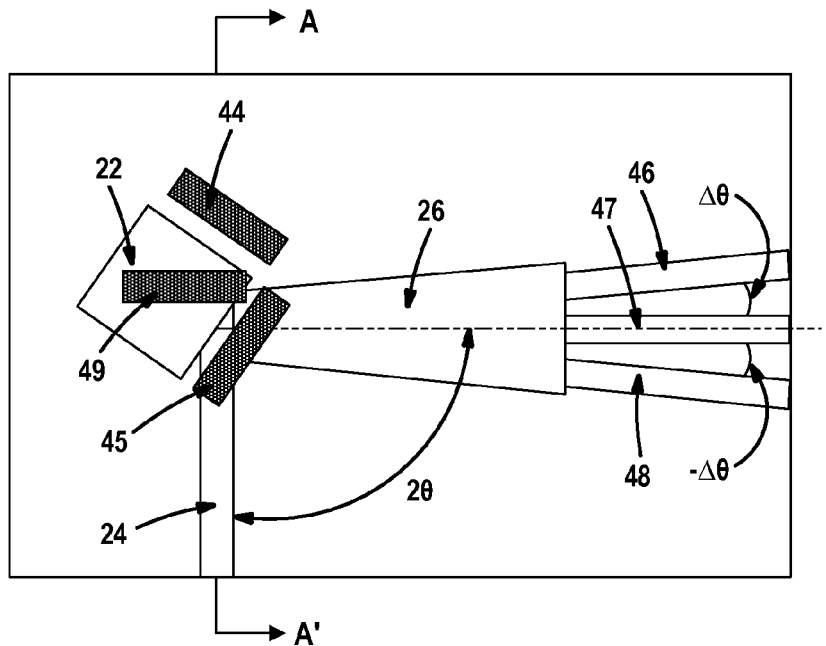
FIGS. 5A and 5B are a top view and a cross-sectional view, respectively, of an exemplary embodiment of a 1×3 photonic switch deployed as a 1×3 scheme with three electrodes.
Figure 5B:
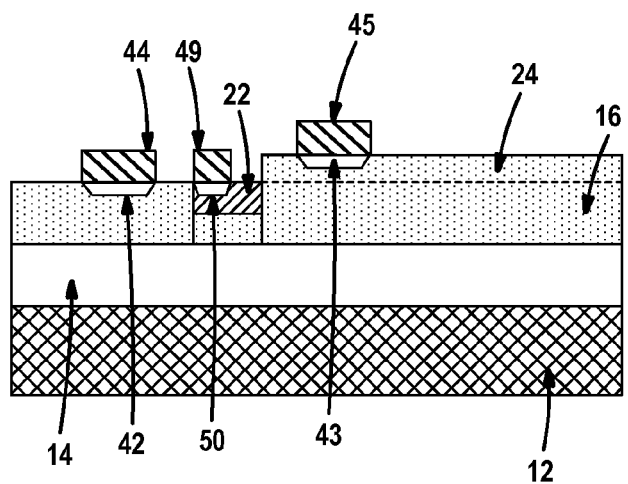

To create a third switching mode, a third electrode is employed by the switching mechanism 30. FIGS. 5A and 5B depict exemplary embodiment of a 1×3 photonic switch 40 having three electrodes. In the exemplary embodiment, apart from the two original electrodes—cathode and anode 44, 45, the third electrode—gate electrode 49 can be disposed on the top of the mirror as a gate electrode with an n-type doped region 50 formed underneath the gate electrode 49.

Figure 5C:
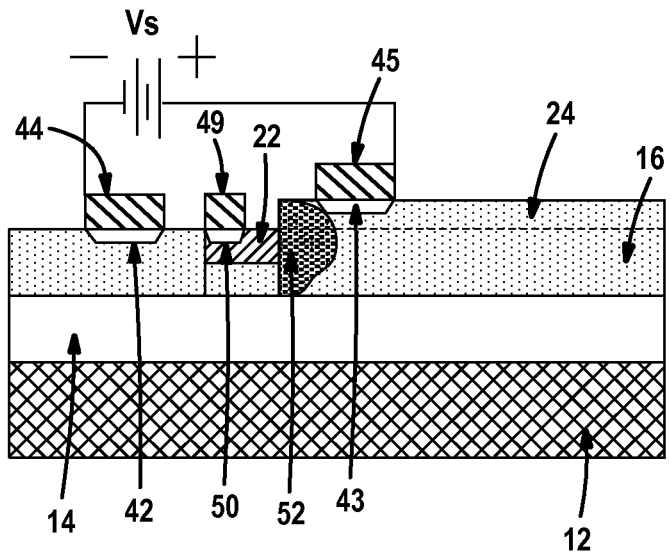
FIGS. 5C and 5D are the schematic depictions of injection and depletion processes, respectively, with the selective deployments of the three electrodes in the exemplary embodiment shown in FIGS. 5A and 5B.

During operation, an electrical drive voltage of $+V_s$ (the first ON-state) may be applied between the cathode 44 and the anode 45 and thereby causing an injection process of free carriers as indicated at 52 in FIG. 5C. An inhomogeneous electric field distribution will be formed between these two electrodes where the mirror is inside to implement the first ON-state switching operation from the OFF-state of the 1×3 switch with three electrodes. In this ON-state of switching, the operating process with the free-carrier dispersion effect is an injection process of free-carriers and the optical signal is switched from the middle port 47 to the upper port 46 of the output tapered waveguide structure.

Figure 5D:
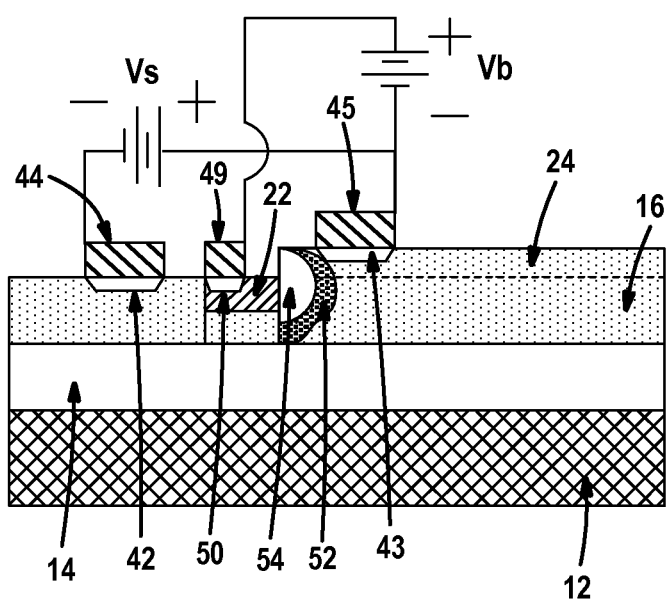

The third electrode 49 may be used to implement a depletion process of free carriers as shown in FIG. 5D. Specifically, the third gate electrode 49 is used to apply a reverse bias voltage $V_b$ and then a depletion process of free carriers is created adjacent to the reflecting surface as indicated at 54, such that the change of the refractive index is inverse to the operation for the injection process of free carriers described above. Namely, as the concentration decreases, the ERI will have a mini-angle rotation at the clockwise direction. As a result, the reflection beam will have a shift to the bottom direction in both position and direction, which is exactly opposite to that of the aforementioned injection process of free carriers and thereby direct the optical signal from the upper port 46 to the lower output port 48 of the output tapered waveguide structure. In this way, a 1×3 switching operation is achieved.

In the aforementioned 1×3 photonic switch with the electrical drive system of three electrodes—cathode, anode and gate electrodes, both the injection and depletion process of free carriers are synchronously deployed to implement two ON-state switching operations, so the efficient combination of the injection and depletion processes is required and the following parameters can determine the switching performance: the relative distance and the intersection angle ($\beta$) of the cathode and the anode electrodes; the relative position of the gate electrode and the intersection angle ($\beta'$) with the anode electrode; the concentration of the n-type and p-type heavy doping underneath anode and cathode; the concentration of the n-type heavy doping underneath gate electrode; the concentration of the background doping in silicon waveguide layer; the performance and efficiency of the optical waveguide/CTM system; and the voltage applied to the electrodes.

The switching arrangement described above can have a wide range of applications, including optical communications and information technology, test & measurement instrumentation, optical sensing, photonic data processing, the aerospace industry, and other optical networks. For instance, optical networks commonly use reconfigurable optical add-drop multiplexer (ROADM) to remotely switch traffic. There are mainly two interesting technologies for the ROADM systems: one is the wavelength selective switch (WSS) and the other is planar lightwave circuit (PLC). This switch arrangement could be used for PIC-WSS products for reducing component foot print, lessening packaging cost reduction and/or increasing performance.

In the area of optical instrument test & measurement instrumentation, various optical switches and matrix switches are most popular components or modules. The currently existing technologies for optical switches can not make the main performance specifications such as micro-size, high-speed and low-loss exist on one device. This switch arrangement could be used to participate in reducing the tension between the performance and scale and make photonic switch/matrix switch, WSS and ROADM have the high performance for all the specification on one device chip The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A micro-size photonic switch, comprising:
   a mirror having a reflecting surface;

an input waveguide having an input configured to receive an optical signal and an output interfaced with the reflecting surface;
a tapered output waveguide having an input interfaced with the reflecting surface to receive the optical signal reflected by the mirror and two output ports to output the reflected optical signal, where a critical angle formed between the input waveguide and the tapered output waveguide at the reflecting surface exceeds the angle at which total internal reflection occurs;
a switching mechanism operable to change concentration of free carrier distribution along the reflective surface and thereby shift the angle and position at which the optical signal reflects from the mirror, where the mirror, the input waveguide and the tapered output waveguide are comprised of a semiconductor material.

2. The photonic switch of claim 1 wherein the switching mechanism further comprises a doped region of a semiconductor material adjacent to the reflecting surface, and an electrode electrically coupled to the doped region to apply a drive voltage thereto, such that the drive voltage changes the concentration of the free carrier distribution along the reflective surface.

3. The photonic switch of claim 2 wherein the switching mechanism operates to inject the free carriers in the doped region.

4. The photonic switch of claim 1 wherein the switching mechanism further comprises an n-typed doped area and a p-type doped area disposed such that the reflecting surface of the mirror is between the n-type doped area and the p-type doped area, and a pair of electrodes electrically coupled to the p-type doped area and the n-type doped area to apply a drive voltage thereto, such that an electric field between the pair of electrodes changes the concentration of the free carrier distribution along the reflecting surface.

5. The photonic switch of claim 1 having n switching modes, where the angle at which the optical switch reflects from the mirror differs in each switch mode and the input of the tapered output waveguide intersects each of the switching modes.

6. The photonic switch of the claim 5 wherein the tapered output waveguide having an output for each switching mode and a structure that tapers from the outputs towards the input of output waveguide.

7. The photonic switch of claim 1 wherein the tapered output waveguide is further defined as a multi-mode interferometer.

8. The photonic switch of claim 1 further comprises two output channel waveguides, each output channel waveguide having an input interfaced with a different output port of the tapered output waveguide and an output.

9. The photonic switch of claim 1 wherein the mirror, input waveguide and the output waveguide are formed in a silicon layer of a silicon-on-insulator structure.

10. A micro-size photonic switch, comprising:
a mirror having a reflecting surface;
an input waveguide having an input configured to receive an optical signal and an output interfaced with the reflecting surface;
a tapered output waveguide having an input interfaced with the reflecting surface to receive the optical signal reflected by the mirror and three output ports to output the reflected optical signal, where the mirror, the input waveguide and the tapered output waveguide are comprised of a semiconductor material, and a critical angle formed between the input waveguide and the tapered output waveguide at the reflecting surface exceeds the angle at which total internal reflection occurs; and
a switching mechanism operable to change refractive index of semiconductor material along the reflective surface and thereby shift the angle and position at which the optical signal reflects from the mirror.

11. The photonic switch of claim 10 wherein the switching mechanism further comprises an n-type doped area and a p-type doped area disposed such that the reflecting surface of the mirror is between the n-type doped area and the p-type doped area, and a cathode electrode and an anode electrode electrically coupled to the p-type doped area and the n-type doped area, respectively, to apply a drive voltage thereto, such that the drive voltage increases the concentration of the free carrier distribution of along the reflecting surface of the mirror.

12. The photonic switch of claim 11 wherein the drive voltage increase the concentration of hole distribution along the reflecting surface of the mirror.

13. The photonic switch of claim 11 wherein the switching mechanism further comprises another n-type doped area formed in the mirror adjacent to the reflecting surface and a gate electrode electrically coupled to the another n-type doped region to apply a reverse bias voltage thereto, such that the reverse bias voltage decreases the concentration of the free carrier distribution along the reflecting surface of the mirror.

14. The photonic switch of claim 10 having n switching modes, where the angle at which the optical switch reflects from the mirror differs in each switch mode and the input of the output waveguide intersects each of the switching modes.

15. The photonic switch of the claim 14 further comprises three output channel waveguides, each output channel waveguide having an input interfaced a different output port of the tapered output waveguide and an output.

16. The photonic switch of claim 10 wherein the tapered output waveguide is further defined as a multi-mode interferometer.

17. The photonic switch of claim 10 wherein the mirror, input waveguide and the output waveguide are formed in a silicon layer of a silicon-on-insulator structure.

18. A micro-size photonic switch, comprising:
a mirror having a reflecting surface;
an input waveguide having an input configured to receive an optical signal and an output interfaced with the reflecting surface;
a tapered output waveguide having an input interfaced with the reflecting surface to receive the optical signal reflected by the mirror and three output ports to output the reflected optical signal, where the mirror, the input waveguide and the tapered output waveguide are comprised of a semiconductor material, and a critical angle formed between the input waveguide and the tapered output waveguide at the reflecting surface exceeds the angle at which total internal reflection occurs; and
a switching mechanism operable to change concentration of free carrier distribution along the reflective surface and thereby linearly change the refractive index of the semiconductor material of the tapered output waveguide along the reflective surface the mirror, wherein the switching mechanism includes a n-type doped area and a p-type doped area disposed such that the reflecting surface of the mirror is between the n-type doped area and the p-type doped area, and a cathode electrode and an anode electrode electrically coupled to the p-type doped area and the n-type doped area, respectively, to apply a drive voltage thereto, such that the drive voltage increases the concentration of the free carrier distribution along the reflecting surface of the mirror.

\* \* \* \* \*